United States Patent
Medina (10) Patent No.: US 11,173,823 B2
(45) Date of Patent: Nov. 16, 2021

(54) UTILITY, FARM, AND GARDEN DUMP WAGON UNLOADING FACILITATOR

(71) Applicant: Paul M. Medina, Haiku, HI (US)

(72) Inventor: Paul M. Medina, Haiku, HI (US)

(*) Notice: Subject to any disclaimer, the term of this patent is extended or adjusted under 35 U.S.C. 154(b) by 178 days.

(21) Appl. No.: 16/501,787

(22) Filed: Jun. 10, 2019

(65) Prior Publication Data
US 2020/0114798 A1    Apr. 16, 2020

Related U.S. Application Data

(60) Provisional application No. 62/766,314, filed on Oct. 15, 2018.

(51) Int. Cl.
*B60P 1/28* (2006.01)
*B62D 63/06* (2006.01)

(52) U.S. Cl.
CPC .............. *B60P 1/286* (2013.01); *B62D 63/06* (2013.01)

(58) Field of Classification Search
CPC .... B60P 1/283; B60P 1/04; B60P 1/28; B60P 1/64; B60P 1/24; B60P 1/26; B60P 3/42; B60P 1/00; B60P 1/14; B60P 1/38; B60P 1/60
USPC ....... 298/17 T, 5, 1 A, 17 R, 1 C, 10, 17 SG, 298/18, 22 P, 22 R, 38, 1 R; 414/373, 414/498, 334, 424, 486, 563, 680, 810
See application file for complete search history.

(56) References Cited

U.S. PATENT DOCUMENTS

| | | | | |
|---|---|---|---|---|
| 2,992,011 | A * | 7/1961 | Becan | A01G 20/40 280/654 |
| 4,156,337 | A * | 5/1979 | Knudson | A01D 43/063 56/13.6 |
| 4,393,645 | A * | 7/1983 | Moore | A01D 43/063 56/202 |
| 4,852,338 | A * | 8/1989 | Hopkins | A01D 43/063 56/202 |
| 4,957,306 | A * | 9/1990 | Greenberg | B62B 1/20 280/47.24 |
| 6,318,808 | B1 * | 11/2001 | Shayne | B60P 1/24 298/1 A |
| 6,354,619 | B1 * | 3/2002 | Kim | B62B 3/106 280/649 |
| 8,496,298 | B2 * | 7/2013 | Martini | B60P 1/04 298/5 |
| 10,040,470 | B1 * | 8/2018 | Horowitz | B62B 3/007 |

(Continued)

*Primary Examiner* — D Glenn Dayoan
*Assistant Examiner* — Sunsurraye Westbrook
(74) *Attorney, Agent, or Firm* — Chen-Chi Lin (57) ABSTRACT

The unloading facilitator of the present invention includes a shaped unloading facilitator and grab-strap. The unloading facilitator is designed to fit into utility, farm and garden dump wagons and is shaped to conform to the body of the utility, farm and garden dump wagons and to overlap the top edge of the dump wagons. The overlap design stabilizes the unloading facilitator while material is loaded into the dump wagons. The unloading facilitator is used for removing all the material from the dump wagons when the dump wagons are in the dumping position. When material-loaded dump wagons are placed in the dumping position, most of the material remains in the dump wagons because the material stops sliding out as soon as the material contacts the ground. Presently all material would have be removed manually with a shovel, rake or garden hoe.

15 Claims, 8 Drawing Sheets

(56) References Cited

U.S. PATENT DOCUMENTS

D879,204 S * 3/2020 Zhu .............................. D21/425
2010/0090444 A1* 4/2010 Chen ....................... B62B 3/007
                                                                                                                  280/651

* cited by examiner

UTILITY, FARM, AND GARDEN DUMP WAGON UNLOADING FACILITATOR

CROSS-REFERENCE TO RELATED APPLICATIONS

Not Applicable

STATEMENT REGARDING FEDERALLY SPONSORED RESEARCH OR DEVELOPMENT

Not Applicable

BRIEF SUMMARY OF THE INVENTION

It is therefore an object of the invention to provide a method of removing all contents of the utility, farm and garden dump wagons.

It is also an object of the invention to eliminate the need for shovel, rake or hoe to remove the complete contents of the utility, farm and garden dump wagons. Typically the contents begin to slide down when the utility, farm and garden dump wagons are in the dumping position. However, when the contents make contact with the ground the majority of the contents remain in the dump wagons.

It is also an object of the invention to save time and physical exertion it takes manually to completely remove the contents of the utility, farm and garden dump wagons.

It is all an object of the invention a means to transport material with the use of the unloading facilitator. This is done by placing the unloading facilitator in a utility, farm and garden dump wagon; placing material in the unloading facilitator; transporting the material to a first location and placing the dump wagon in the dumping position; sliding the unloading facilitator with the material completely out of the dump wagon; carrying or pulling the unloading facilitator by the grab strap with the material in it to a desired location.

BACKGROUND OF THE INVENTION

1. Field of the Invention

The invention relates to utility, farm and garden dump carts with 2, 3 or 4 wheels. More particularly, the invention relates to a removable unloading facilitator for said dump carts.

2. Description of the Related Art

Farm, garden and general land maintenance is a global on-going necessity. The state of the art utility, farm and garden dump carts are extensively used transporting material from one location to another and dumping the material.

Unfortunately the majority of the material remains in the cart.

Figure 1:
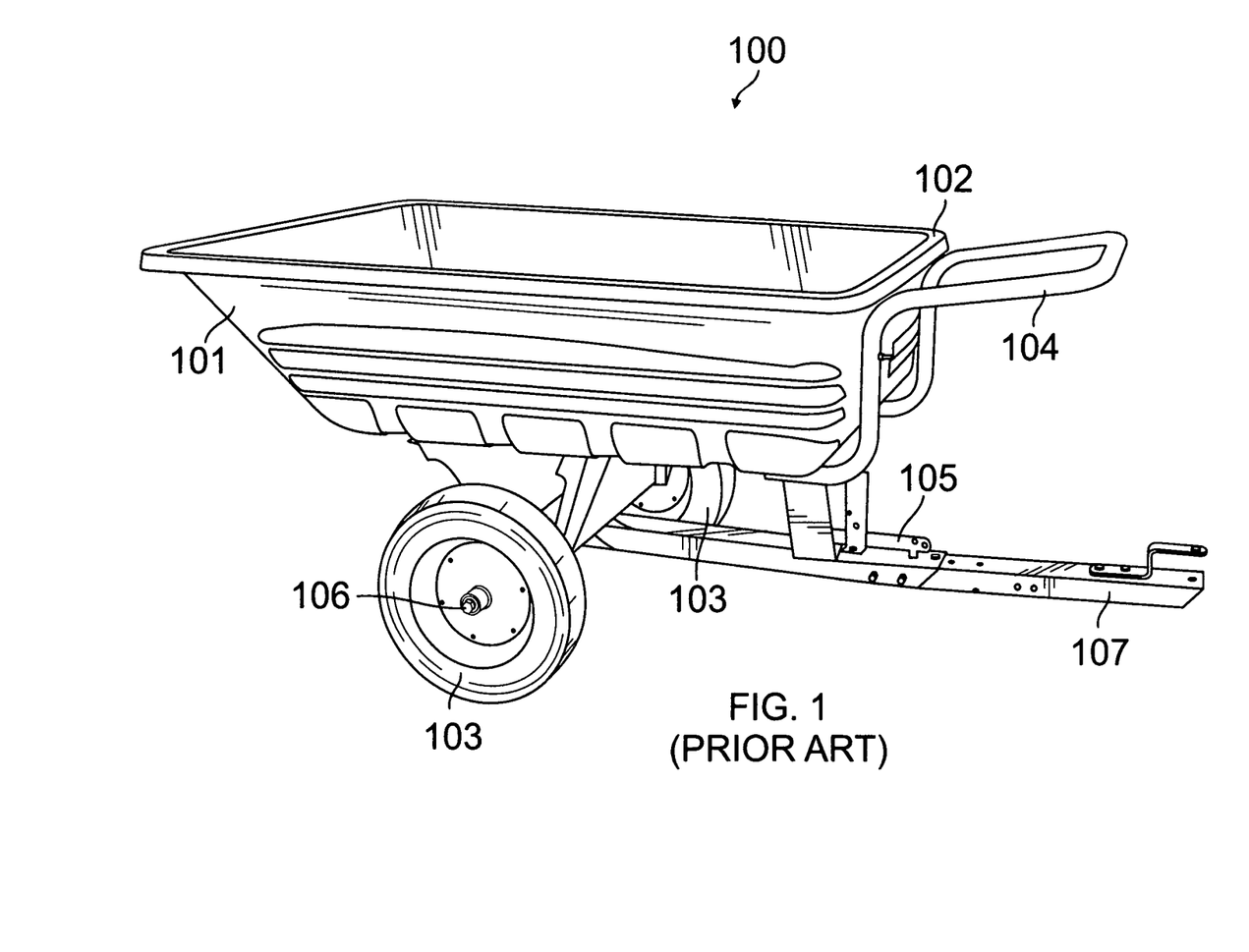
FIG. 1 is a perspective view of a prior art utility, farm and garden dump wagon used for moving material from one location and dumping it in another location.

Prior art FIG. 1 shows a typical 2-wheel dump cart.

Figure 2:
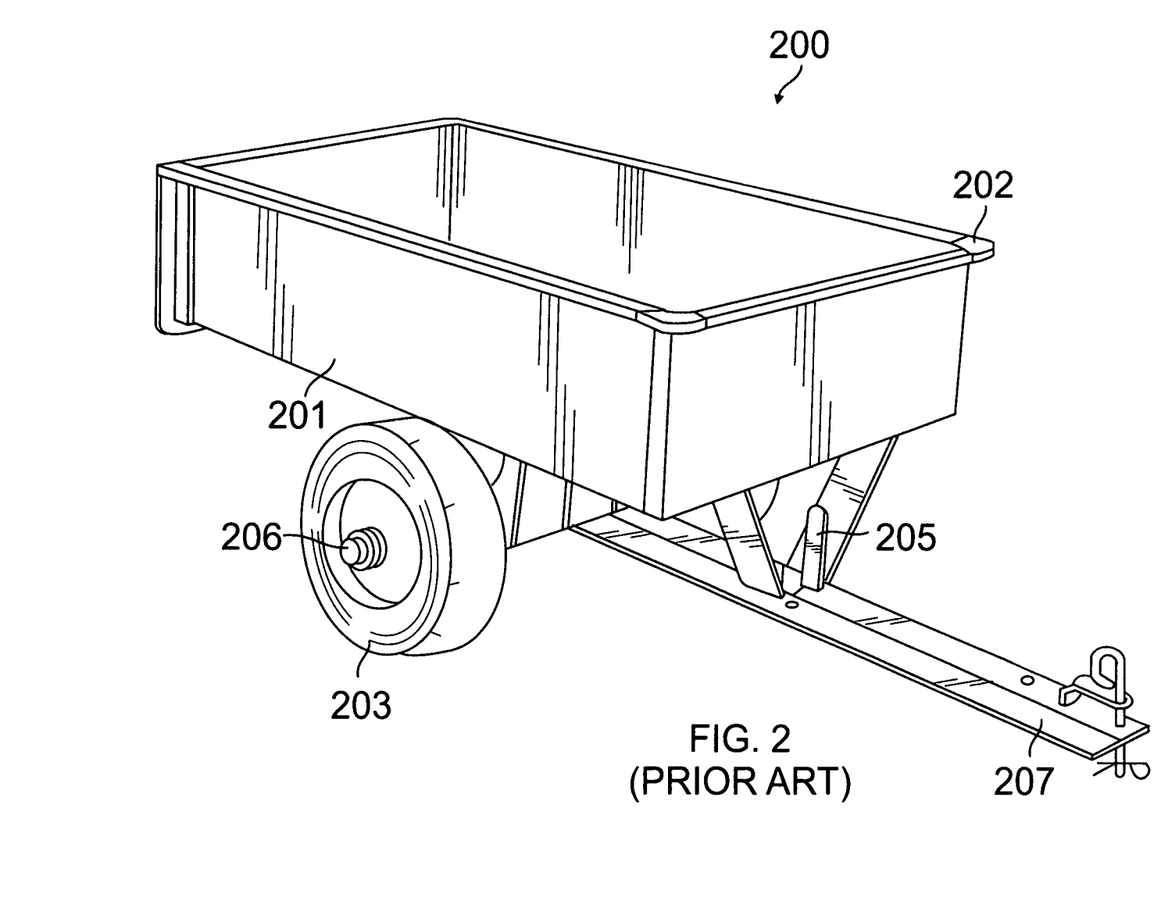
FIG. 2 is a perspective view of a prior art rectangular-style utility, farm and garden dump wagon with removable tail gate used for moving material from one location and dumping it in another location.

Prior art FIG. 2 shows a rectangular 2-wheel dump cart.

Although these utility, farm and garden wagons are designed with a dump feature, the effectiveness of the dump feature leaves a lot to be desired due to the lack of complete removal of the contents of the utility, farm and garden dump carts without the use of tools and manual labor. When a material-loaded dump cart is placed in the dump position, the material slides out but stops as soon as it makes contact with the ground There is currently nothing available to remedy this problem; however, the present invention can solve this problem.

The unloading facilitator can also be used to carry or drag material (depending on weight of material) such as compost or mulch through a garden area where a dump wagon might be too large to fit through a garden area.

DESCRIPTION OF THE DRAWINGS

The rectangular utility, farm and garden dump wagon in FIG. 2 illustrates the different shapes of utility, farm and garden dump wagons but they function in the same dumping process.

DETAILED DESCRIPTION OF THE INVENTION

The preferred embodiments of the invention are described in detail below with reference to the figures, wherein like elements are referenced with like numerals throughout.

FIG. 1 illustrates a utility, farm and garden dump wagon 100 used for transporting material such as mulch, horse manure, compost or soil and dumping the material at a desired location.

FIG. 2 illustrates a rectangular utility, farm and garden wagon 200, which functions the same as the dump wagon 100 in FIG. 1. However, FIG. 2 is referenced to illustrate a different shape of a utility, farm and garden dump wagon The utility, farm and garden dump wagon 100 in FIG. 1 shall be the dump wagon 100 referenced throughout.

The material to be transported is placed in the body 101 of the dump wagon 100. A user can transport the material by grabbing the handle 104 and lifting the tongue 107 of the dump wagon 100 off the ground and move the material with the use of the wheels 103. The dump wagon can be pulled or pushed by the handle 104 or the dump wagon can be towed by hooking the tongue 107 onto a small tractor or a riding lawn mower.

When the user arrives at the desired location she or he wanted to transport the material to, the user releases the lever 105 of the dump wagon 100 in order to tip the body

101 over the wheels 103 in order to remove the material out and over the top edge 102 of the body 101.

Figure 7:
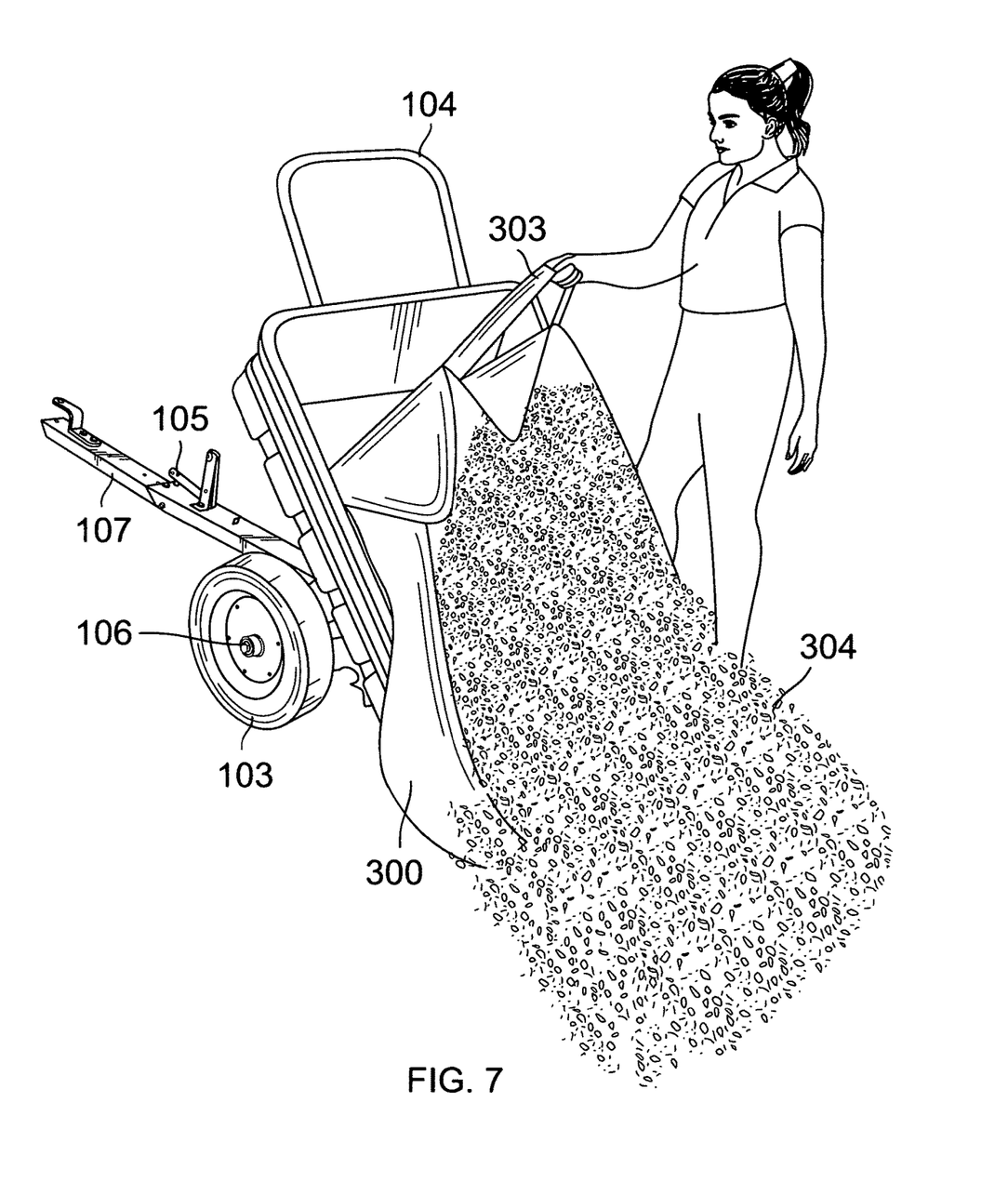
FIG. 7 illustrates a person beginning to pull the grab strap of the unloading facilitator in FIG. 3.

When the dump wagon 100 is tipped in the dump position the material begins to slide out but stops when the material 304 in FIG. 7 makes contact with the ground. The majority of the material remains in the dump wagon 100 whereby user would have to use a garden hoe, shovel or rake to remove the remaining material.

Problems with the prior art in FIG. 1, FIG. 2 and smaller dump wagons that are in the dumping position are:

most of the material remains in the dump wagon and the remaining material has to be removed manually.

These problems can be solved by the present invention.

The dimensions for the body 101 for the most popular dump wagon used are 33" wide and 48" long. The body 101 is 12" deep at the front of the dump wagon 100 where the handle 104 is. The distance from the top edge 102 to the floor of the body 101 at the front of the body 101 is 12". The distance slanting from the top edge 102 to the floor at the rear part of the body 101 is 16". Dump wagons of any size can be used with the present invention.

Figure 3:
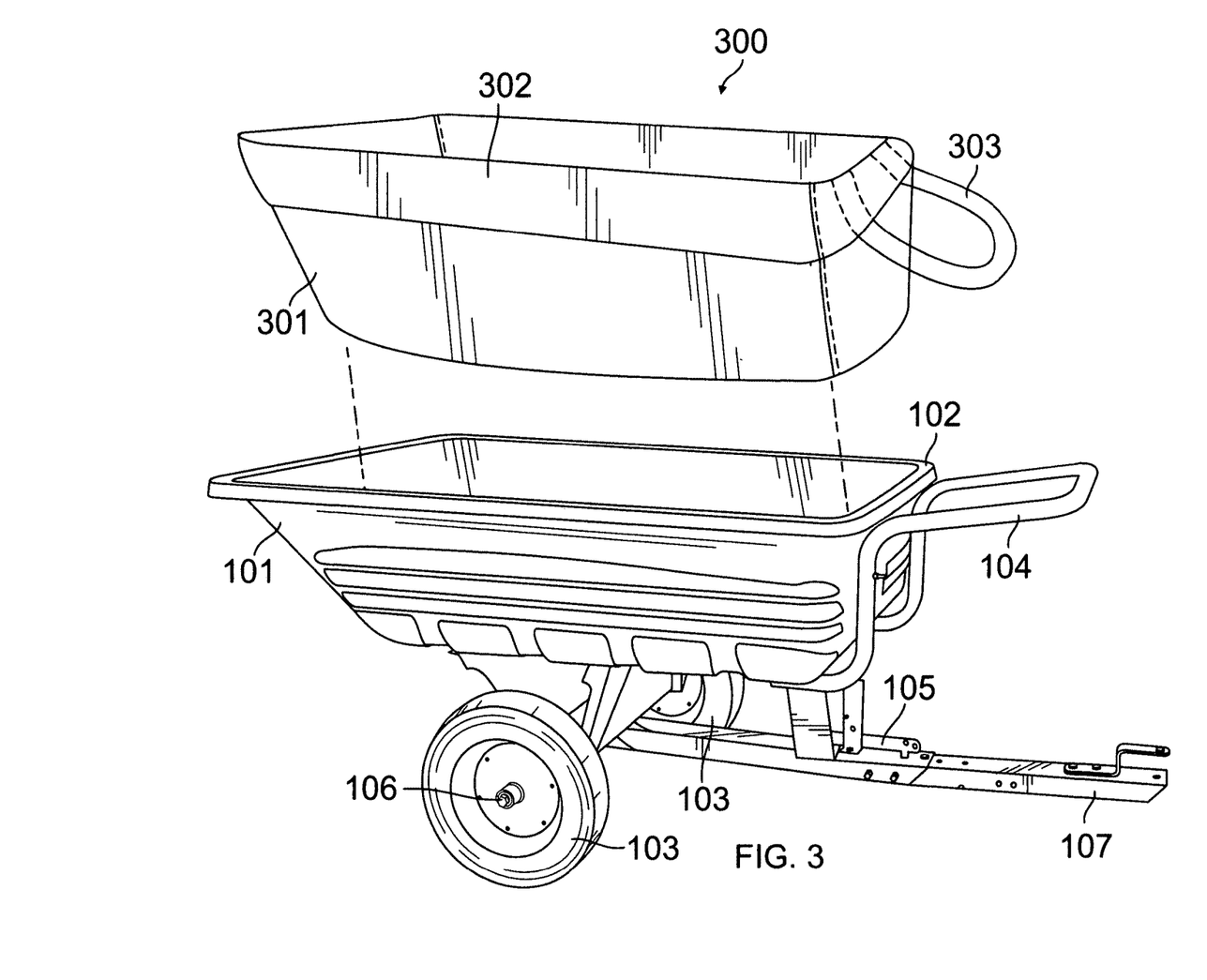
FIG. 3 illustrates an unloading facilitator according to the invention to be placed in the utility, farm and garden dump wagon in FIG. 1.

FIG. 3 illustrates an unloading facilitator 300 to be placed in the utility, farm and garden wagon 100. The unloading facilitator 300 has a body 301.

Figure 4:
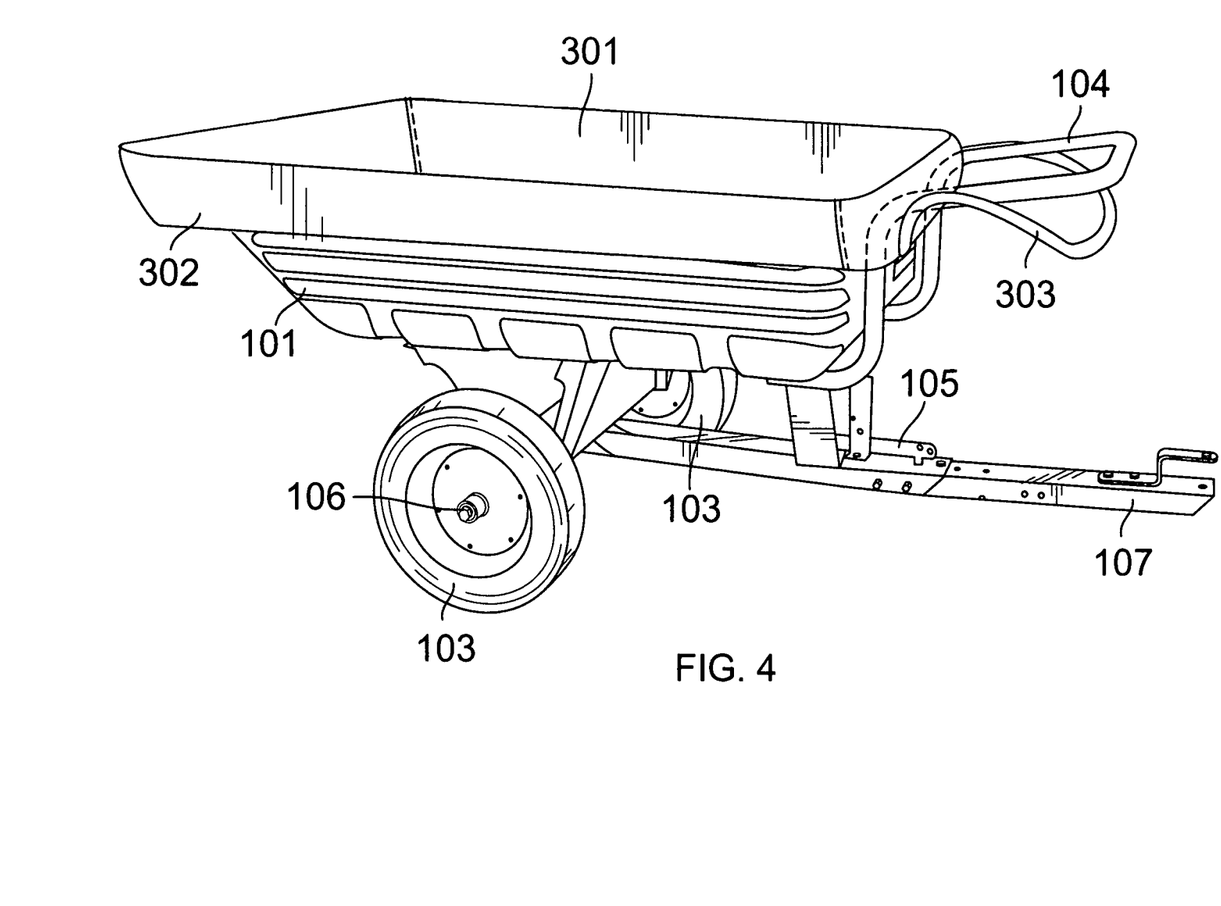
FIG. 4 is a perspective view of an unloading facilitator according to the invention placed within and shaped to the utility, farm and garden dump wagon in FIG. 1.

FIG. 4 illustrates an unloading facilitator 300 according to the invention which is a shaped fabric with a grab-strap 303 attached to the front-end. The unloading facilitator 300 conforms to the shape of the dump wagon 100.

Figure 5:
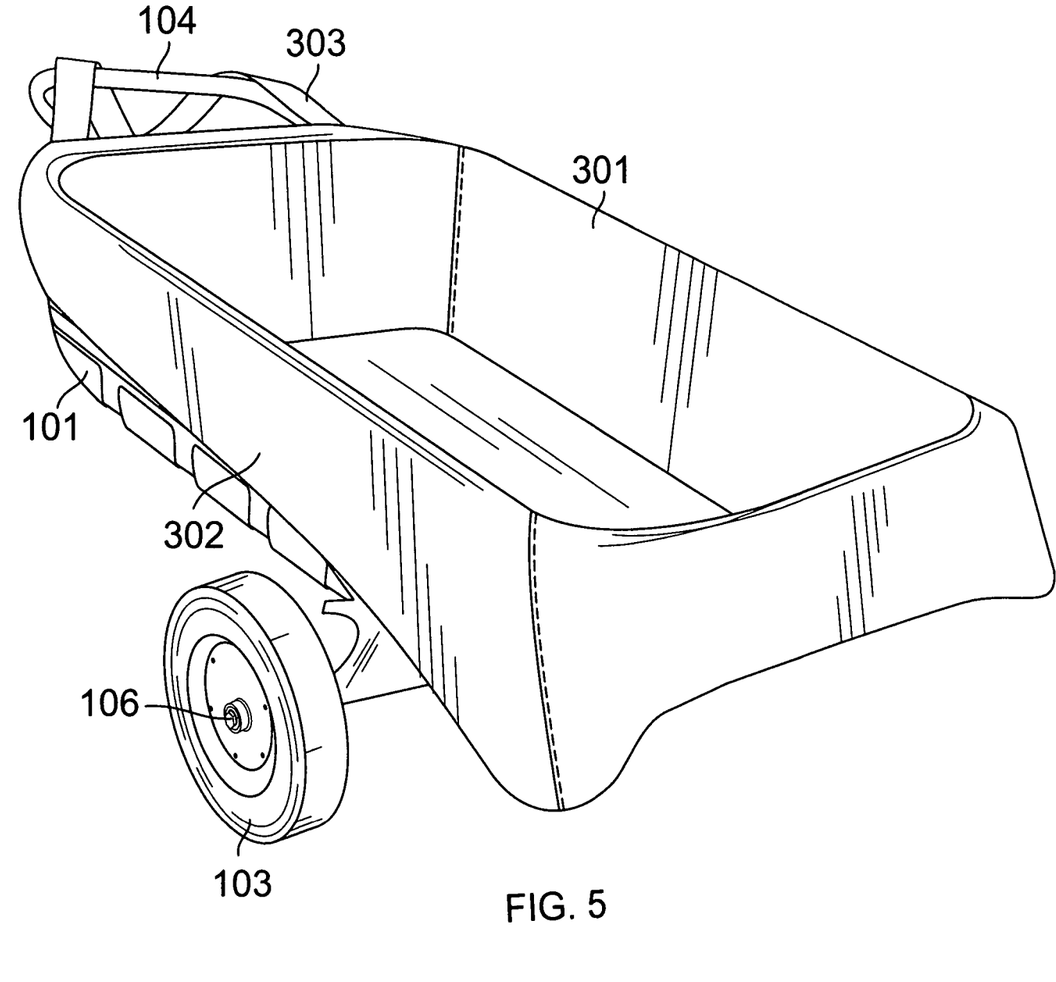
FIG. 5 is a perspective view of the unloading facilitator liner according to the invention within and shaped to the utility, farm and garden dump wagon in FIG. 1 from a different angle.

FIG. 5 illustrates a different view of the unloading facilitator 300 within the body 101 and conforming to the shape of the body 101. In one embodiment the lip 302 illustrated in FIG. 5 evenly overlaps the perimeter of the top edge 102. This embodiment provides a better fit between the lip 302 and the top edge 102. This embodiment also provides a fit for a deeper dump wagon.

Figure 6:
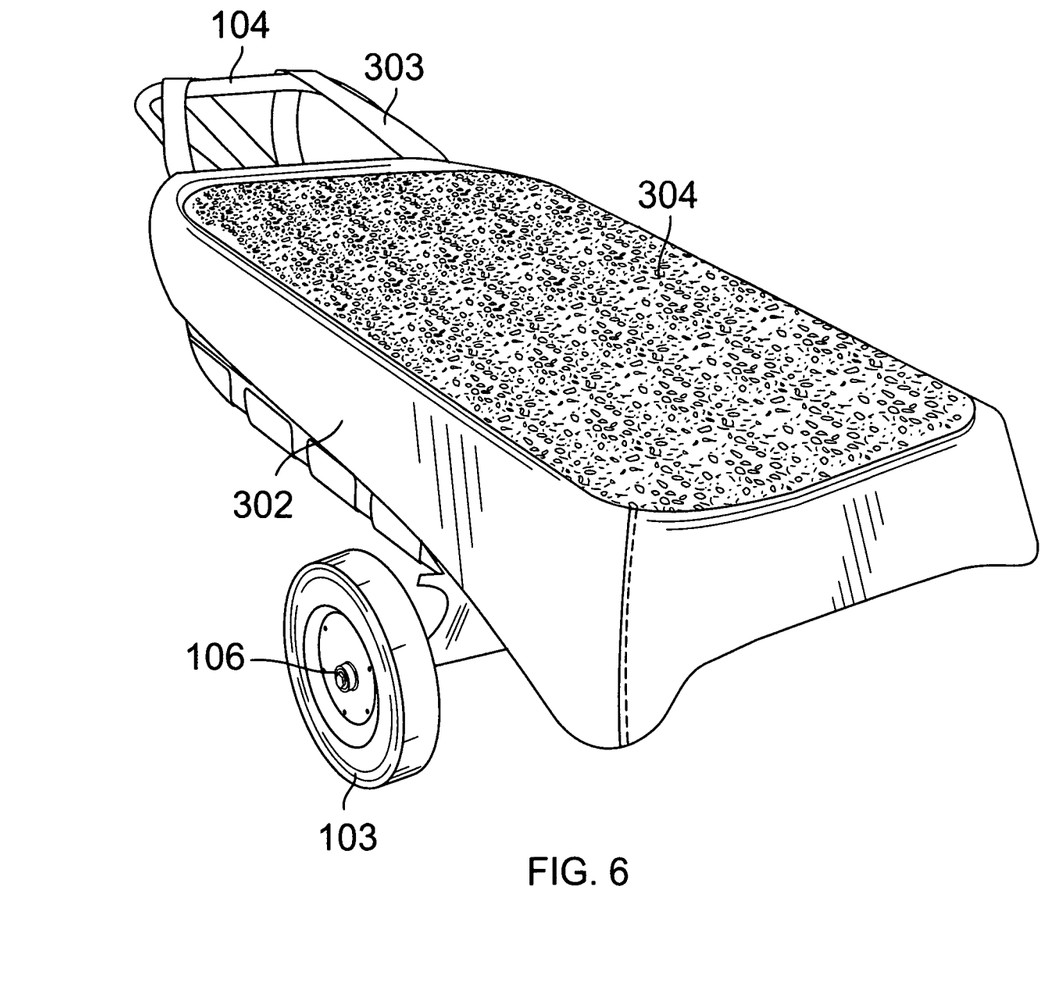
FIG. 6 is a perspective view of an unloading facilitator according to the invention within the utility, farm and garden dump wagon in FIG. 1 and with material in the unloading facilitator to be transported to another location and then dumped.

FIG. 6 illustrates the unloading facilitator 300 within the dump wagon 100 and with material 304 illustrated in FIG. 6 in the unloading facilitator 300.

FIG. 7 illustrates the unloading facilitator 300 within the dump wagon 100, with material 304 within the unloading facilitator 300 and with the dump wagon 100 in the dumping position. The user would first tilt the dump wagon 100 into the dumping position by pulling the lever 105 and lifting the handle 104 whereby the dump wagon 100 pivots over the wheel axle 106.

FIG. 7 also illustrates the user beginning to pull the grab strap 303 attached to the front of the unloading facilitator 300.

Figure 8:
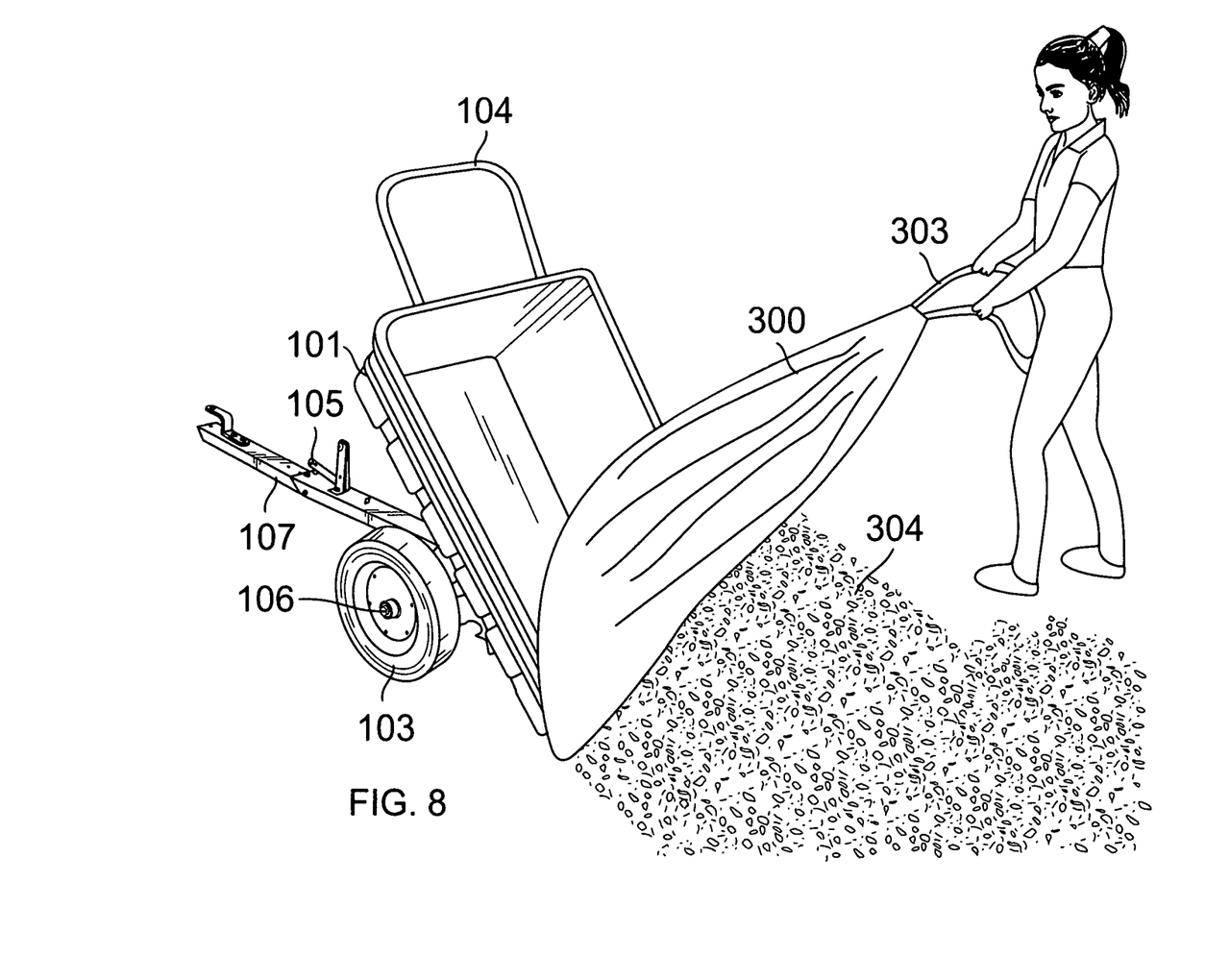
FIG. 8 illustrates the person in FIG. 7 pulling the unloading facilitator by the grab strap and removing all the material from the utility, farm and garden dump wagon in FIG. 1.

FIG. 8 illustrates the user removing the remaining material 304 within the unloading facilitator 300 by pulling the grab strap 303 until all the material 304 is removed from the dump wagon 100.

The invention claimed is:

1. An unloading facilitator for a wagon comprising two, three, or four wheels, the unloading facilitator comprising
   a body comprising
      a top edge; and
   a lip extending away from a perimeter of the top edge of the body of the unloading facilitator;
   wherein the body of the unloading facilitator conforms with a floor and a plurality of walls of a body of the wagon; and
   wherein the lip overlaps a perimeter of a top edge of the body of the wagon.

2. The unloading facilitator of claim 1, wherein the body of the unloading facilitator is made of a flexible woven material; and wherein the lip of the unloading facilitator is made of the flexible woven material.

3. The unloading facilitator of claim 2 further comprising a grab strap attached to a front of the unloading facilitator, wherein the grab strap is made of the flexible woven material.

4. The unloading facilitator of claim 1 further comprising seamed corners.

5. The unloading facilitator of claim 1 further comprising a grab strap attached to a front of the unloading facilitator, wherein a portion of the grab strap is between the body of the wagon and the lip of the unloading facilitator.

6. An unloading facilitator for a wagon, the unloading facilitator comprising
   a body;
   a lip connected to the body; and
   a grab strap attached to a front of the unloading facilitator;
   wherein the body, the lip, and the grab strap of the unloading facilitator are made of a fabric material.

7. The unloading facilitator of claim 6, wherein the body of the unloading facilitator comprises a cavity configured to receive a plurality of materials; and wherein the cavity of the body of the unloading facilitator conforms to a cavity of the wagon.

8. The unloading facilitator of claim 7, wherein a top edge of the wagon is between the body of the unloading facilitator and the lip of the unloading facilitator.

9. The unloading facilitator of claim 8, wherein a portion of the grab strap is between the body of the wagon and the lip of the unloading facilitator.

10. The unloading facilitator of claim 9, wherein the body of the unloading facilitator is made of a flexible woven material; wherein the lip of the unloading facilitator is made of the flexible woven material; and wherein the grab strap of the unloading facilitator is made of the flexible woven material.

11. An unloading facilitator for a wagon, the unloading facilitator comprising
   a body;
   a lip connected to the body; and
   a grab strap attached to a front of the unloading facilitator;
   wherein the body of the unloading facilitator comprises a cavity configured to receive a plurality of materials; and wherein the cavity of the body of the unloading facilitator conforms to a cavity of the wagon;
   wherein a top edge of the wagon is between the body of the unloading facilitator and the lip of the unloading facilitator;
   wherein a portion of the grab strap is between the body of the wagon and the lip of the unloading facilitator; and
   wherein a first depth at a first location of the cavity of the body of the unloading facilitator is smaller than a second depth of a second location of the cavity of the body of the unloading facilitator; and wherein the first location is closer to the grab strap than the second location.

12. An unloading facilitator for a wagon, the unloading facilitator comprising
   a body; and
   a lip connected to the body;
   wherein the lip extends away from a perimeter of a top edge of the body of the unloading facilitator; and
   wherein a first depth at a first location of a cavity of the body of the unloading facilitator is smaller than a second depth at a second location of the cavity of the body of the unloading facilitator; and wherein the first location is closer to a grab strap than the second location.

13. An unloading facilitator for a wagon, the unloading facilitator comprising
a body; and
a lip connected to the body;
wherein the lip overlaps a perimeter of a top edge of a body of the wagon; and wherein the perimeter of the top edge of the body of the wagon is of a rectangular shape.

14. An unloading facilitator for a wagon, the unloading facilitator comprising
a body; and
a lip connected to the body;
wherein the wagon is a first wagon comprising a first depth at a center of a cavity of a body of the first wagon; wherein a second wagon comprises a second depth at a center of a cavity of a body of the second wagon; wherein the first depth is smaller than the second depth; and wherein a first hanging length of the lip of the unloading facilitator placing on the first wagon is longer than a second hanging length of the lip of the unloading facilitator placing on the second wagon.

15. An unloading facilitator for a wagon, the unloading facilitator comprising
a body;
a lip connected to the body; and
a grab strap attached to a front of the unloading facilitator;
wherein the unloading facilitator is characterized by:
an installed condition in which
the body of the unloading facilitator conforms with a floor and a plurality of walls of a body of the wagon; and
the lip overlaps a perimeter of a top edge of the body of the wagon;
a filled condition in which
a cavity of the unloading facilitator is filled with a plurality of materials;
a dumping condition in which
the grab strap of the unloading facilitator is pulled so that a portion of the body of the unloading facilitator is separated from the body of the wagon; and
a portion of the plurality of materials is unloaded from the cavity of the unloading facilitator; and
a carried condition or a dragging condition in which
the grab strap of the unloading facilitator is held; and
the unloading facilitator is carried or dragged to a pre-determined location.

\* \* \* \* \*